United States Patent [19]

Crosby

[11] 4,312,407
[45] Jan. 26, 1982

[54] SPRING TRIP MECHANISM FOR PLOWS

[75] Inventor: William D. Crosby, La Porte, Ind.

[73] Assignee: Allis-Chalmers Corporation, Milwaukee, Wis.

[21] Appl. No.: 110,220

[22] Filed: Jan. 7, 1980

[51] Int. Cl.³ .............................................. A01B 61/04
[52] U.S. Cl. ..................................... 172/261; 172/266
[58] Field of Search ............... 172/269, 267, 264, 265, 172/266, 261, 494

[56] References Cited

U.S. PATENT DOCUMENTS

| | | | |
|---|---|---|---|
| 530,819 | 12/1894 | Baker | 172/267 |
| 3,022,835 | 2/1962 | Jennings | 172/269 |
| 3,662,839 | 5/1972 | Thorsrad | 172/266 |
| 3,910,354 | 10/1975 | Johnson | 172/267 |
| 3,972,374 | 8/1976 | Venable | 172/266 X |

Primary Examiner—Richard J. Johnson

[57] ABSTRACT

A trip mechanism 41 for a plow standard 11 includes a pair of toggle links 46, 61 having their remote ends pivotally connected, respectively, to a plow frame 15 and the standard 11. Link 61 includes a leaf spring 63 with a rolled end 86 pivotally connected to the link 46 by a pin 88 normally disposed in an overcenter position; however, when excessive working forces are encountered, the leaf spring 63 deflects somewhat in the manner of a cantilevered beam causing the pin 88 to move from its overcenter position to a tripped position thus allowing the plow standard 11 to swing upwardly about its pivot axis 16.

11 Claims, 9 Drawing Figures

SPRING TRIP MECHANISM FOR PLOWS

TECHNICAL FIELD OF THE INVENTION

The present invention relates to an earthworking implement having a trip mechanism which includes an overcenter linkage incorporating a spring member.

BACKGROUND OF THE INVENTION

Heretofore, others have provided overcenter toggle-type trip mechanisms for plows which have incorporated spring mechanisms. U.S. Pat. Nos. 3,662,839; 3,910,354; and 3,972,374 disclose trip mechanisms having overcenter toggle linkages with spring mechanisms. When the earthworking implement of such mechanisms is subjected to excessive working forces, the spring mechanism deflects to cause the toggle to release from its locked, overcenter position.

BRIEF DESCRIPTION OF THE PRESENT INVENTION

The trip mechanism for an earthworking implement includes a pair of interconnected links having their remote ends pivotally connected to the implement frame and tool standard, respectively, on first and second horizontal parallel axes. One of the links includes an elongated rigid part having a leaf spring rigidly secured to one end thereof. The leaf spring extends alongside the rigid part and terminates in a lower offset bearing portion which is pivotally connected by a pivot pin to the other link (which is rigid) on a third axis parallel to and disposed intermediate the first and second axes. A pair of cooperating abutments on the links are normally in engagement to limit relative pivotal movement of the links toward an overcenter position. That is, the third axis is in an overcenter position relative to a line intersecting the first and second axes when the abutments are in engagement. The leaf spring deflects in the manner of a cantilevered beam when excessive working forces are imposed on the tool standard, causing the third axis to move from its locked, overcenter position to a tripped position on the opposite side of a line intersecting the first and second axes. When the operator causes the plow frame to be raised, the plow swings by gravity to its working position and the trip mechanism is again reset in its locked, overcenter position without additional operator manipulation.

BRIEF DESCRIPTION OF THE DRAWINGS

One embodiment of the present invention is illustrated in the drawings in which.

DETAILED DESCRIPTION OF THE DRAWINGS

Figure 1:
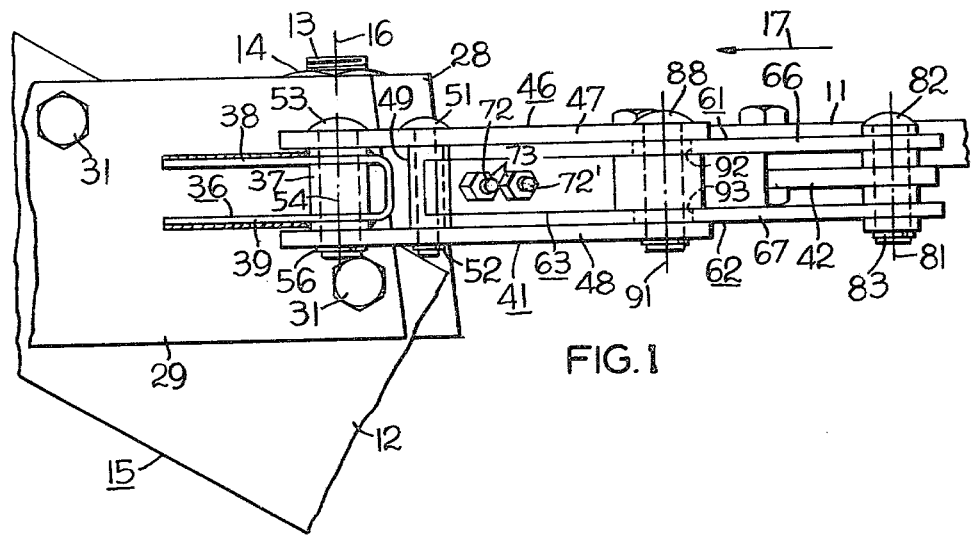
FIG. 1 is a top view of a trip mechanism incorporating the present invention.
Figure 2:
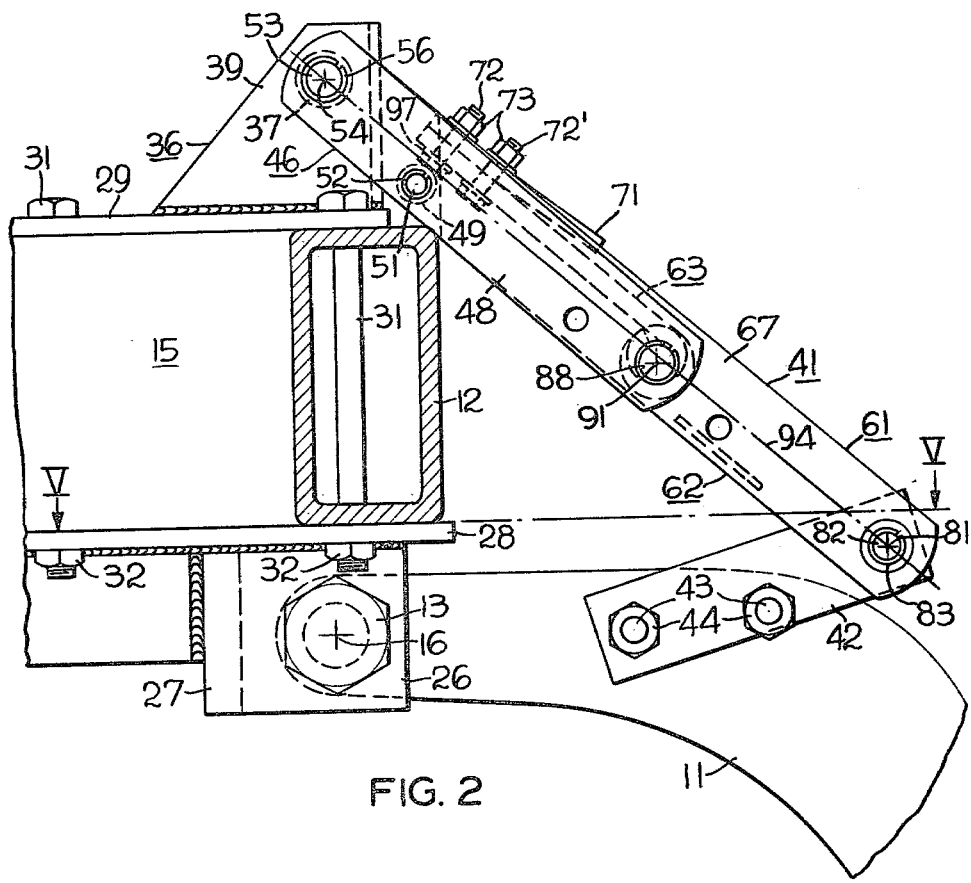
FIG. 2 is a side view of the trip mechanism shown in FIG. 1.

Referring to FIGS. 1 and 2, a tool standard 11 is pivotally connected to a tubular diagonal frame member 12 of a plow frame 15 by pivot means in the form of a bolt 13 and nut 14 for vertical swinging movement about a horizontal transverse axis 16 which is transverse to the direction of travel of the plow during a working operation, which direction is indicated by arrow 17.

Figure 5:
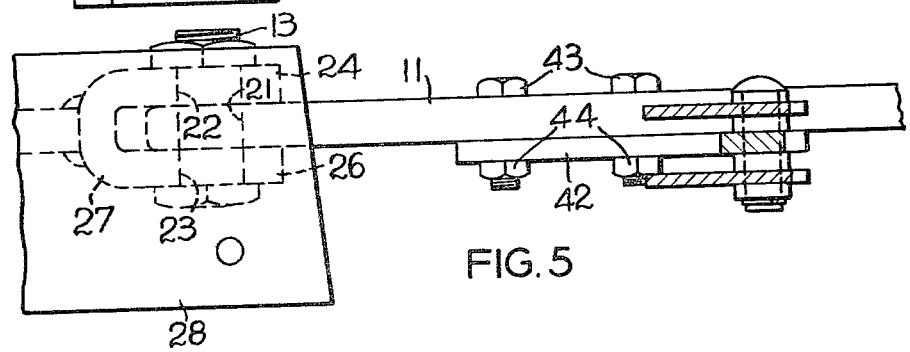
FIG. 5 is a view taken along the line V—V in FIG. 2.

Referring also to FIG. 5, it will be noted that the bolt 13 includes a shank part extending through an opening 21 in the upper end of the standard 11 and through aligned openings 22, 23 in transversely spaced vertical walls 24, 26 of a bracket 27 welded to a horizontal lower plate 28. The lower plate 28 and an upper plate 29 are rigidly secured to the tubular frame member 12 by releasable fastening means in the form of bolts 31 and nuts 32. A U-shaped bracket 36 is secured as by welding to upper plate 29 and includes a bearing sleeve 37 extending through aligned openings in the walls 38, 39 of the bracket 36. The outer ends of the sleeve are welded to the walls 38, 39.

Figure 6:
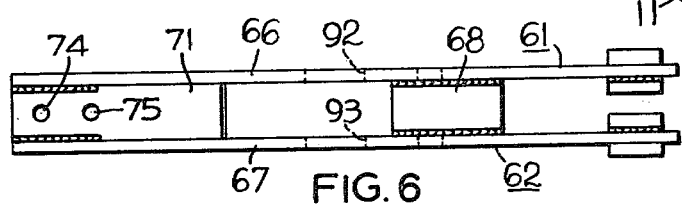
FIG. 6 is a top view of a rigid part of one of the links of the trip mechanism.
Figure 7:
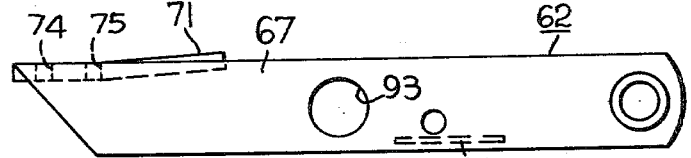
FIG. 7 is a side view of the part shown in FIG. 6.
Figure 8:
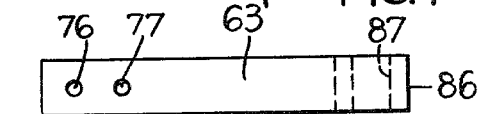
FIG. 8 is a top view of the leaf spring component of one of the links which is normally attached to the rigid part shown in FIGS. 6 and 7.
Figure 9:
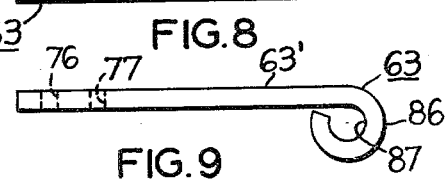
FIG. 9 is a side view of the leaf spring component shown in FIG. 8.

A trip mechanism 41 incorporating the present invention is interconnected between the bracket 36 of the plow frame 15 and a bracket 42 which is rigidly secured to the standard 11 by a pair of bolts 43 and nuts 44. The trip mechanism 41 normally maintains the standard 11 in an earthworking position, as illustrated in FIGS. 1 and 2, and trips, allowing the standard 11 to pivot upwardly to the fully tripped position shown in FIG. 4, when excessive working forces are imposed on the standard as when a buried boulder is encountered by the plow. The trip mechanism 41, which acts like an overcenter toggle linkage in maintaining the standard 11 in its working position, includes a rigid link 46 comprised of a pair of elongated plates 47, 48 interconnected by a cylindrical sleeve 49 and pin 51 extended therethrough and through aligned openings in the plates 47, 48. The pin is secured in its installed condition by a snap ring 52. The upper, forward ends of the plates 47, 48 of the rigid link 46 are pivotally connected to the bracket 36 of the frame 15 by a transverse pivot pin 53 for vertical swinging or pivotal movement about transverse horizontal axis 54. The pin 53 is held in place by a snap ring 56. The trip mechanism also includes a link 61 which comprises a rigid part 62, illustrated in detail in FIGS. 6 and 7, and a spring component in the form of leaf spring 63, which is shown in detail in FIGS. 8 and 9. The rigid part 62 includes a pair of spaced parallel plates 66, 67 rigidly interconnected by a spacer 68 welded to the confronting sides of the plates 66, 67. The upper front end of the rigid part 62 of the link 61 includes a transverse plate 71 welded at its transversely opposite sides to the upper end portions of plates 66, 67. The top of the plate slopes away from the plates 66, 67 in the rearward direction to accommodate deflection of the leaf spring 63 which is rigidly secured at its forward end to the front end of the rigid part 62 by a pair of bolts 72, 72' and nuts 73. The bolts 72, 72' extend through openings 74, 75 in the plate 71 of rigid part 62 and through openings 76, 77 in leaf spring 63. The lower, rear ends of the plates 66, 67 of the rigid part 62 are pivotally connected to bracket 42 of the standard 11 on a transverse horizontal axis 81 by a pivot pin 82 secured in place by a snap ring 83.

The leaf spring 63 includes a flat deflectable part 63' extending downwardly and rearwardly from its rigidly but releasably secured attachment to the upper end of the rigid part 62 to a bearing portion in the form of a rolled end 86 presenting a cylindrical radially inner bearing surface 87 in cooperative pivotal bearing engagement with a transverse pivot pin 88. The bearing surface 87 and cooperative pivot pin 88 are disposed below the flat part of the leaf spring 63 so that when the spring 63 is subjected to tension loading, it will deflect upwardly at its rear end. The pivot pin 88, which is secured in place by a snap ring 89, pivotally connects the leaf spring 63 of the link 62 to the rear end of the rigid link 46 by virtue of it extending through aligned transverse openings in the rear ends of the plates 47, 48. Thus, the links 46 and 61 are pivotally interconnected for relative pivotal movement about a transverse toggle axis 91. The pin 88 extends freely through large aligned openings 92, 93 in the plates 66, 67 of the rigid part 62 of link 61. The holes 92, 93 are sufficiently large to accommodate movement of the pin relative to the rigid part 62 during a tripping operation.

As shown in FIG. 2, the trip mechanism 41 is in an overcenter position, that is, the axis 91 of pin 88 is below a line 94 intersecting axis 54 and axis 81. A pair of cooperating abutments in the form of the sleeve 49 and the head of bolt 72 engage to limit relative pivotal movement of the links 46, 61 in a downward direction during normal operations. As illustrated, the abutments are disposed intermediate the axes 54 and 91. The abutment represented by the head of bolt 72 may be adjusted by adding or removing one or more washers 97 from between the head of bolt 72 and the upper end of the link 61.

Figure 3:
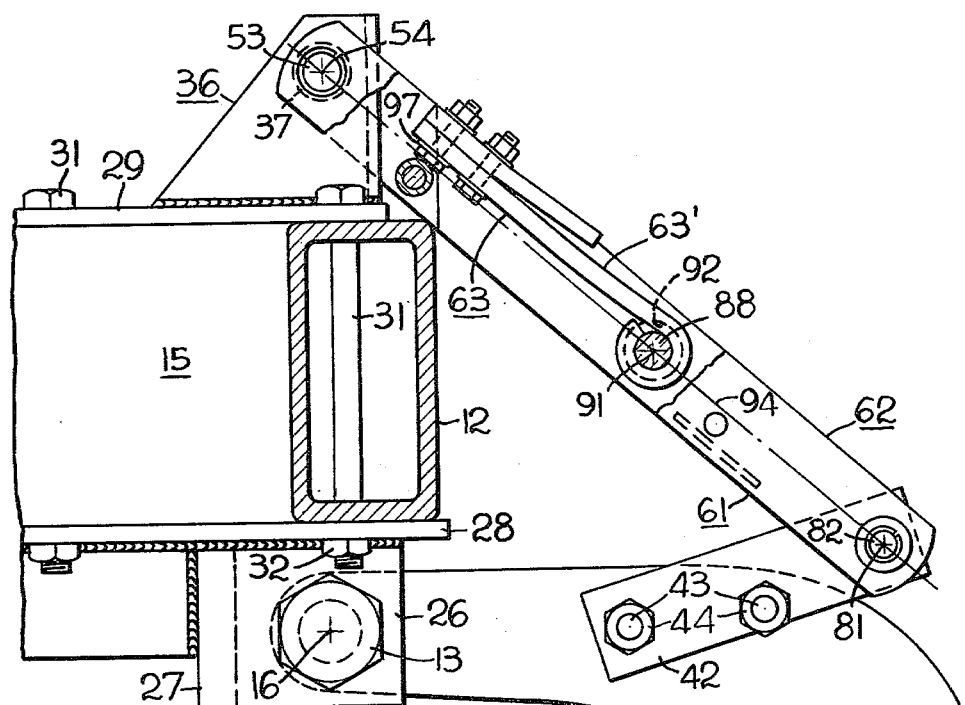
FIG. 3 is a side view of the trip mechanism showing it subjected to excessive working forces causing the spring member of the trip mechanism to be deflected.
Figure 4:
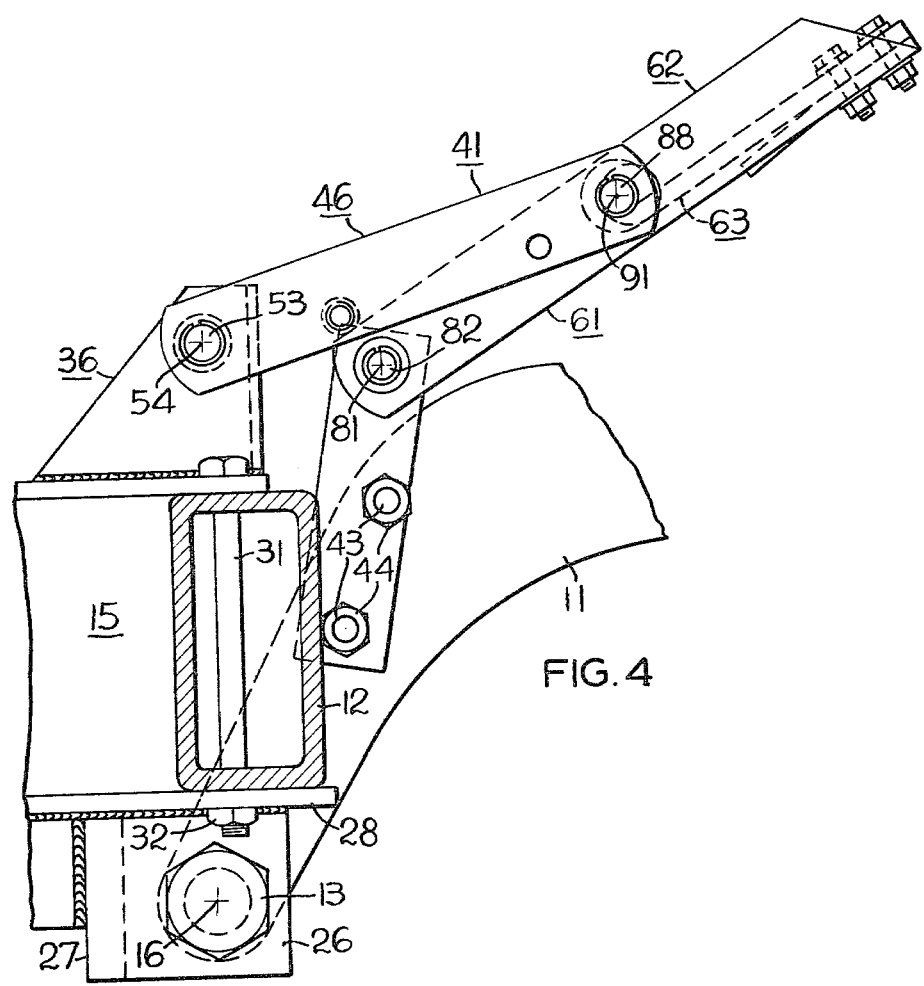
FIG. 4 is a side view of the trip mechanism shown in a fully tripped condition.

When the plow encounters a large buried rock or the like, the standard 11 will be subjected to abnormally high working forces tending to pivot the standard rearwardly and upwardly about the pivot axis 16. These high working forces are resisted by the trip mechanism 41 and when they reach a predetermined magnitude, the leaf spring 63 deflects upwardly at its rolled end in the manner of a cantilevered beam, causing the pin 88 to move upwardly to the "in line" position shown in FIG. 3, wherein its axis 91 is centered on (coincides with) the line 94 through the axes 54 and 81. A slight additional working force on the standard 11 will move the pivot pin 88 upwardly beyond the "in line" position shown in FIG. 3 permitting the toggle to "break" or collapse to a tripped position as shown in FIG. 4.

The operator can cause the plow to again be locked by its trip mechanism 41 in its working position by simply causing the plow frame 15 to be raised whereupon the plow will swing by gravity to its working position and the trip mechanism will reset in its overcenter position.

The embodiments of the invention in which an exclusive property or privilege is claimed are defined as follows:

1. In an earthworking implement having a frame, a tool standard, pivotal means pivotally attaching the standard to the frame and a trip mechanism between said frame and standard normally maintaining said standard in an earthworking position and accommodating pivotal movement about said pivot means when excessive working forces are imposed on said standard, characterized by said trip mechanism including
   a first rigid link pivotally connected at one of its ends to said frame on a first horizontal axis
   a second link having
      a rigid part pivotally connected at one of its ends to said standard on a second horizontal axis in parallel, spaced relation to said first axis and
      a leaf spring rigidly secured at one of its ends to the other end of said rigid part and having a flat part extending a predetermined distance toward said one end of said rigid part, where it terminates in a bearing portion presenting a bearing surface disposed below said flat part of said spring,
   a pivot pin cooperatively engaging said bearing surface of said bearing portion and pivotally connecting the latter to the other end of said first link on a third axis parallel to and disposed intermediate said first and second axes,
   cooperating abutments on said first and second links, respectively, normally engaging to limit relative pivotal movement in one direction, said abutments being located intermediate said first and third axes,
   said third axis being in an overcenter position relative to a line intersecting said first and second axes when said abutments are in engagement, said leaf spring deflecting under tension loading when excessive working forces are imposed on said standard causing said third axis to move from said overcenter position to a tripped position on the opposite side of said line intersecting said first and second axes whereby said standard is released from its earthworking position.

2. The implement of claim 1 wherein said other end of said rigid part is disposed in overlying relation to said abutment on said first link and said one end of said spring is releasably secured to said one other end of said rigid part by releasable fastening means.

3. The implement of claim 2 wherein said releasable fastening means includes a nut and bolt.

4. The implement of claim 3 wherein said abutment on said second link is the head of said bolt.

5. The implement of claim 1 wherein said pivot pin has a lost motion connection with said rigid part of said second link.

6. In an earthworking implement having a frame, a tool standard, pivotal means pivotally attaching the standard to the frame and a trip mechanism between said frame and standard normally maintaining said standard in an earthworking position and accommodating pivotal movement about said pivot means when excessive working forces are imposed on said standard, characterized by said trip mechanism including
   a first rigid link pivotally connected at one of its ends to said frame on a first horizontal axis
   a second link normally in general alignment with said first link and having
      an elongated rigid part pivotally connected at one of its ends to said standard on a second horizontal axis in parallel, spaced relation to said first axis and having a portion of substantial length including its other end in juxtaposed relation to said first link,
      a leaf spring rigidly secured at one of its ends to said other end of said rigid part and having a flat portion extending toward said second axis, terminating in a bearing portion disposed below said flat portion,
   pivot means pivotally interconnecting said bearing portion to the other end of said first link on a third horizontal axis parallel to and disposed intermediate said first and second axes, cooperating abutments on said first and second links, respectively, normally engaging to limit relative pivotal movement in one direction, said abutments being spaced from said third axis in the direction of said first axis said third axis being in an overcenter position relative to a line intersecting said first and second axes when said abutments are in engagement, said leaf spring deflecting under tension loading when excessive working forces are imposed on said standard causing said third axis to move from said overcenter position to a tripped position on the opposite side of said line intersecting said first and second axes whereby said standard is released from its earthworking position.

7. The implement of claim 6 wherein said leaf spring is releasably secured to said other end of said rigid part of said second link by releasable fastening means.

8. The implement of claim 6 or 7 wherein one of said abutments is adjustable to permit the position of said third axis to be changed relative to said line intersecting said first and second axes.

9. In an earthworking implement having a frame, a tool standard, pivotal means pivotally attaching the standard to the frame and a trip mechanism between said frame and standard normally maintaining said standard in an earthworking position and accommodating pivotal movement about said pivot means when excessive working forces are imposed on said standard, characterized by said trip mechanism including a first rigid link pivotally connected at one of its ends to said frame on a first horizontal axis a second link normally in general alignment with said first link and having an elongated rigid part pivotally connected at one of its ends to said standard on a second horizontal axis in parallel, spaced relation to said first axis and having a portion of substantial length including its other end in juxtaposed relation to said first link, a leaf spring rigidly secured at one of its ends to said other end of said rigid part and having a flat deflectable part extending toward said second axis, the other end of said spring presenting a bearing portion pivotally connected to the other end of said first link on a third axis parallel to said first and second axes and disposed in lower offset relation to said flat part, a pair of cooperating abutments on said implement normally engaging to limit relative pivotal movement of said links in one direction, one of said abutments being on said second link, said third axis being in an overcenter position relative to a line intersecting said first and second axes when said abutments are in engagement, said other end of said rigid part of said second link being intermediate said first and third axes, said leaf spring deflecting under tension loading when excessive working forces are imposed on said standard causing said third axis to move from said overcenter position to a tripped position on the opposite side of said line intersecting said first and second axes whereby said standard is released from its earthworking position.

10. The implement of claim 9 wherein said bearing portion is a rolled end of said spring at the end of said flat portion.

11. The implement of claim 9 wherein one of said abutments is adjustable to change the overcenter position of said third axis.

* * * * *

UNITED STATES PATENT OFFICE
CERTIFICATE OF CORRECTION

Patent No. 4,312,407   Dated January 26, 1982

Inventor(s) William D. Crosby

It is certified that error appears in the above-identified patent and that said Letters Patent are hereby corrected as shown below:

Column 4, line 33 - the word "one" should have been omitted.

Signed and Sealed this

Twenty-second Day of June 1982

[SEAL]

Attest:

Attesting Officer

GERALD J. MOSSINGHOFF

Commissioner of Patents and Trademarks